United States Patent
Ruef et al.

(10) Patent No.: US 8,725,690 B1
(45) Date of Patent: May 13, 2014

(54) TIME AND BANDWIDTH EFFICIENT BACKUPS OF SPACE REDUCED DATA

(75) Inventors: Richard Ruef, Livermore, CA (US); Christopher Stacey, Christchurch (NZ)

(73) Assignee: EMC Corporation, Hopkinton, MA (US)

( * ) Notice: Subject to any disclaimer, the term of this patent is extended or adjusted under 35 U.S.C. 154(b) by 219 days.

(21) Appl. No.: 12/340,320

(22) Filed: Dec. 19, 2008

(51) Int. Cl.
*G06F 17/30* (2006.01)

(52) U.S. Cl.
USPC ........... 707/640; 707/653; 707/654; 707/661; 707/667

(58) Field of Classification Search
USPC .......... 707/640, 653, 661, 686, 660, 634, 645
See application file for complete search history.

(56) References Cited

U.S. PATENT DOCUMENTS

| | | | | |
|---|---|---|---|---|
| 5,933,104 | A * | 8/1999 | Kimura | 341/87 |
| 7,401,093 | B1 * | 7/2008 | Hamilton et al. | 1/1 |
| 7,603,391 | B1 | 10/2009 | Federwisch et al. | |
| 8,055,618 | B2 * | 11/2011 | Anglin | 707/634 |
| 2003/0233525 | A1 | 12/2003 | Reeves | |
| 2004/0054711 | A1 | 3/2004 | Multer | |
| 2004/0059870 | A1 | 3/2004 | Ash et al. | |
| 2005/0268068 | A1 * | 12/2005 | Ignatius et al. | 711/202 |
| 2006/0075007 | A1 * | 4/2006 | Anderson et al. | 707/206 |
| 2006/0271622 | A1 | 11/2006 | Scheid | |
| 2007/0016547 | A1 * | 1/2007 | Jump et al. | 707/1 |
| 2007/0043938 | A1 | 2/2007 | May et al. | |
| 2007/0208826 | A1 | 9/2007 | Devolites | |
| 2008/0091894 | A1 * | 4/2008 | Retnamma et al. | 711/161 |
| 2008/0195807 | A1 | 8/2008 | Kubo et al. | |
| 2008/0247641 | A1 * | 10/2008 | Rasmusson et al. | 382/166 |
| 2009/0083563 | A1 * | 3/2009 | Murase | 713/324 |
| 2009/0190760 | A1 | 7/2009 | Bojinov et al. | |
| 2009/0234870 | A1 * | 9/2009 | Bates et al. | 707/101 |
| 2010/0185690 | A1 * | 7/2010 | Evans et al. | 707/803 |
| 2010/0205864 | A1 * | 8/2010 | Bonner | 49/324 |

FOREIGN PATENT DOCUMENTS

EP 0684566 11/1995

\* cited by examiner

*Primary Examiner* — Sherief Badawi
*Assistant Examiner* — Sabana s Rahman
(74) *Attorney, Agent, or Firm* — Theodore A. Chen; Krishnendu Gupta

(57) ABSTRACT

A method, article of manufacture, and apparatus for efficiently backing up information are disclosed. In some embodiments, this comprises receiving data and analyzing the data. In some embodiments, the data may be manipulated. In some embodiments, the data may come from multiple sources. Chunk headers, data chunks and chunk maps are then created based on analyzing the data. Chunk headers store the data manipulation technique of the data chunk. In some embodiments, chunk headers store the size of the manipulated and un-manipulated data chunks. The chunk headers, data chunks and chunk maps are then organized into a datastream. The datastream is then stored in a storage device. In some embodiments, the received data may be discarded. In some embodiments, a chunk header is associated with a data chunk.

14 Claims, 6 Drawing Sheets

TIME AND BANDWIDTH EFFICIENT BACKUPS OF SPACE REDUCED DATA

CROSS-REFERENCE TO RELATED APPLICATIONS

This application is related to co-pending U.S. patent application Ser. No. 12/340,284 for TIME AND BANDWIDTH EFFICIENT RECOVERIES OF SPACE REDUCED DATA and filed concurrently herewith, which is incorporated herein by reference for all purposes.

FIELD OF THE INVENTION

The present invention relates generally to information backup systems, and more particularly, to systems and methods of efficiently backing up information.

BACKGROUND OF THE INVENTION

According to one estimate, the size of the digital universe in 2007 was two hundred eighty one billion gigabytes. The estimate goes on to note that the digital universe had a compound annual growth rate of almost sixty percent. With so much information being generated, the need for efficiently backing up information is increasing.

A traditional approach to improving a backup system's performance is data compression. Data compression is the process of encoding raw data such that the encoded data consumes less storage capacity than the raw data.

Another approach to improving a backup system's performance is deduplication. Deduplication removes the redundancy commonly found in all types of data. Examples of such redundancy include multiple copies of the same file in a storage device. By storing only a single instance of the file and using pointers to reference that single instance, deduplication helps to reduce the amount of storage capacity consumed by data.

The above approaches, among others, are useful in reducing the consumption of resources, such as hard disk space or network bandwidth. However, typical backup applications are simply unequipped to handle compressed data. In order for backup applications to understand compressed data, the compressed data must be decompressed. The resulting decompressed data may consume significantly more network bandwidth and storage capacity. There is a need, therefore, for an improved method, article of manufacture, and apparatus for backing up information.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
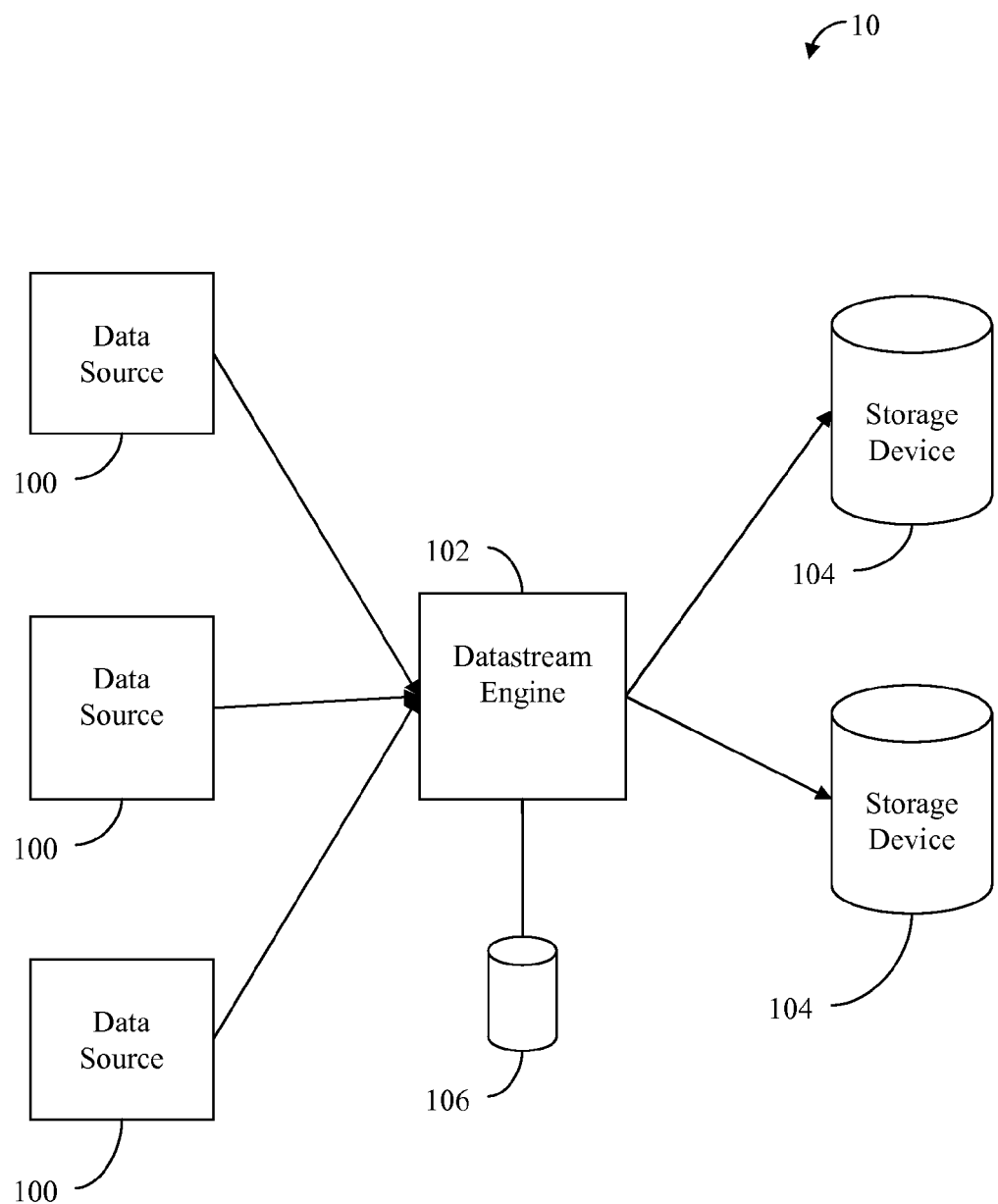
FIG. 1 is a diagram of an embodiment of a backup system in accordance with the invention.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a backup system in the form of a storage system configured to store files, but it should be understood that the principles of the invention are not limited to data storage systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Disclosed herein are a method and system to efficiently backup information. To improve a backup system's performance, compression and/or deduplication may be used. However, compressed data typically must be decompressed in order to be usable, and can be decompressed only if the encoding method is known. The same is true with deduplication. Deduped data typically must be reconstructed in order to be usable, and deduped data can be reconstructed only if the deduping method is known. The requirements of decompression before usability and knowing the correct compression method may be detrimental to many applications, including backup applications.

Referring to FIG. 1, a backup system 10 comprises data sources 100, datastream engine 102, storage units 104 and temporary storage unit 106. Data sources may be transitory or non-transitory. Transitory sources are sources in which the data is moving, such as network traffic. Non-transitory sources are sources in which the data is not moving, such as a disk drive or CD-ROM. As shown by a various storage device 106, any of the foregoing systems may include storage, such as for metadata or temporary storage. It should be understood that although an embodiment is being described as being used with disk drives, any type of storage may be used, such as tape drives, content addressable storage, flash memory, optical drives, CD-Recordable drives, DVD-Recordable drives, non-volatile storage, etc.

Figure 2:
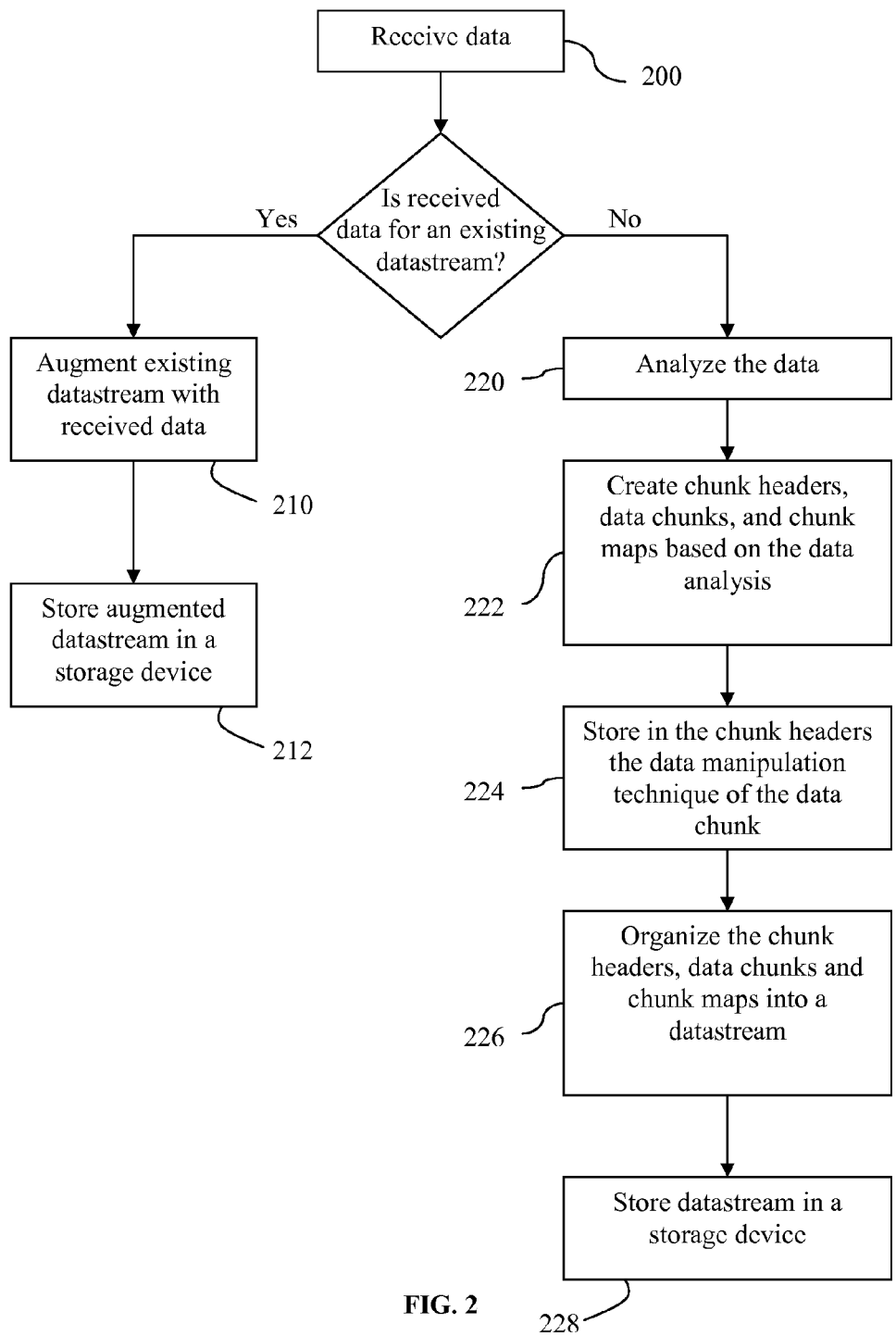
FIG. 2 is a flowchart illustrating a process for backing up information in some embodiments of the invention.

A method for saving data, illustrated in FIG. 2, comprises receiving data in step 200. The received data may come from a variety of data sources, as illustrated in FIG. 1, and through a variety of mediums. In some embodiments, the received data may come compressed via a network connection. In some embodiments, the received data may come from other sources. The received data need not be compressed before being received by the present invention. Raw data may be stored by the present invention, or may be compressed by the present invention utilizing any compression method beforehand.

The treatment of the received data depends on the existence of a datastream. If the received data is for an existing datastream, then Datastream engine 102 uses the received data to augment the existing datastream, step 210. After the existing datastream has been augmented, the augmented datastream is stored in a storage device, step 212. If the received data is not for an existing datastream, then Datastream engine 102 analyzes the data into a datastream, step 220. Datastream engine 102 then creates chunk headers, data chunks, and chunk maps based on the data analysis, step 222. Datastream engine 102 then stores in the chunk headers the data manipulation technique of the data chunk, step 224. In step 226, the chunk headers, data chunks and chunk maps are organized into a datastream. After the datastream has been organized, the datastream is stored in a storage device, step 228. As illustrated by FIG. 1, the datastream may be transmitted to multiple storage units 104. In some embodiments, the storage device is a tape storage device.

Figure 3:
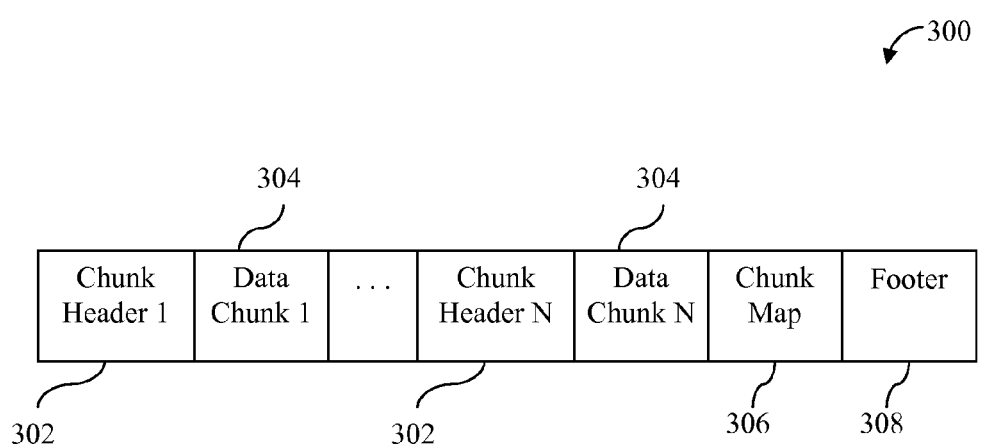
FIG. 3 is a diagram of a datastream in some embodiments of the invention.

FIG. 3 illustrates a datastream in some embodiments. Datastream 300 contains Chunk headers 302, Data chunks 304 and Chunk map 306, and Footer 308. Chunk header 302 indicate the beginning of a data chunk. Data chunks 304 contain segments of data. In some embodiments, Data chunks 304 may have a pre-determined size. Chunk map 306 points to chunk headers 304 in Datastream 300. Footer 308 indicates the end of Datastream 300. By organizing received data into datastreams, many of the problems associated with compressed data are alleviated.

Compressed data, by its nature, is difficult to read. Data compression techniques may compress an entire stream of data. This may result in the compressed data being unreadable by any application, except for the application that compressed the data (or applications that have been programmed to process that compressed data). For example, if a stream of data contained a Word document, an Excel spreadsheet, and a wave audio file, the resulting compressed data would be unreadable by MS Word, MS Excel, or any wave audio player. Even if the stream of data contained just one file, the resulting compressed data would be unreadable by any application, except for the application that compressed the data. Furthermore, compressed data can only be decompressed by knowing the compression technique. For example, if data was compressed by an application using the DEFLATE technique, it could not be decompressed by an application using the LZO technique.

Backup applications are unfamiliar with many types of compression methods, and thus, compressed data is typically decompressed before being sent to backup applications. This undermines the purpose of compressing data—to consume fewer resources during transmission and storage.

In some embodiments, Chunk headers 302 may be used to address this problem. Chunk headers 304 may contain information about data chunks, including the data manipulation technique used on the data chunk. In some embodiments, data chunks may come directly from the received data. For example, if the received data was a compressed datastream, the data chunks may correspond to the compressed block structure of the received data. In various embodiments, information about the data manipulation technique may be acquired from the received data (such as associated metadata), characteristics of the received data, the user, etc. In some embodiments, this information may include the size of the manipulated data chunk (e.g. 8k or 16k, etc.), the size of the un-manipulated data chunk (e.g. 16k or 32k, etc.) and the data manipulation technique utilized. By storing information about the data manipulation technique, backup applications will be able to process the data regardless of which data manipulation technique was utilized to manipulate the data. Backup applications will now be able to understand the manipulated data by reading the chunk headers. Manipulating data includes compressing data, encrypting data, and/or deduping data, etc. In some embodiments where the data manipulation technique includes data compression, this allows for the backup of any form of compressed data without the need for decompression.

Figure 4:
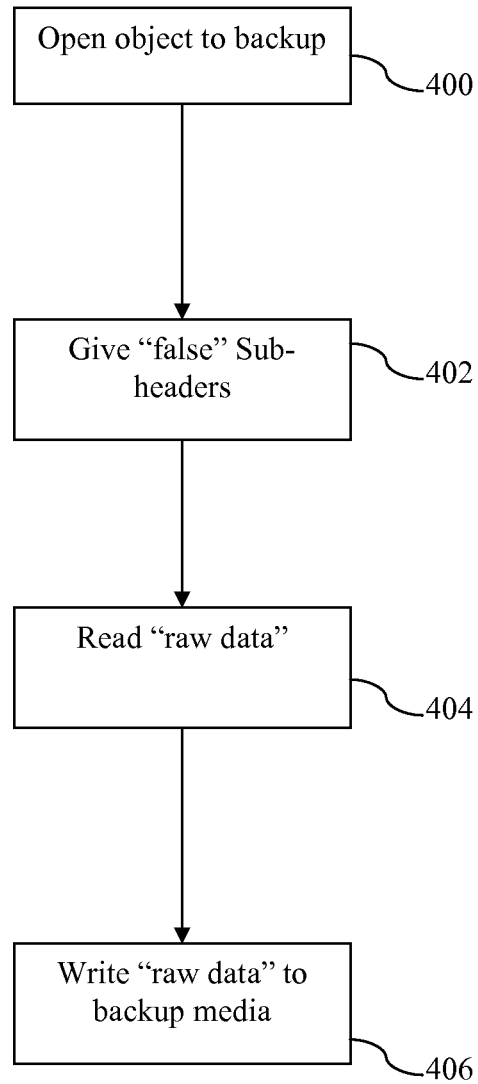
FIG. 4 is a flowchart illustrating a process for backing up information in some embodiments of the invention.

In some embodiments, it may be desirable to "lie" to the backup application about the characterization of the data. FIG. 4 illustrates how the present invention may be used with Celerra, a product developed by EMC Corporation. In step 400, Celerra opens an object to backup. In step 402, "false" chunk headers are given to Celerra. The "false" chunk headers describe the size of the data, among others. However, the description of the data size reflects the size of the compressed data, as opposed to the size of the raw data. In step 404, Celerra then reads in what it thinks is the "raw data", but in fact is compressed data. In step 406, Celerra then writes the "raw data" to a backup media.

In some embodiments, it may be undesirable to have a data chunk compressed. This may occur when the cost of data loss exceeds the benefits of fewer resources consumed. In some embodiments, the chunk headers may show a "null" for the compression technique utilized. Accordingly, the size of the data chunk and the size of the uncompressed data chunk will be the same.

Knowing the compression method further allows backup applications to receive (save) compressed data in one form, and deliver (restore) compressed data in a different form. This may be desirable in some embodiments. In some embodiments, the initial save may utilize a loss-less data compression technique. When restoring, storage capacity may be less than anticipated and it may be required that a lossy-data compression technique be utilized in order to meet storage requirements.

It may be beneficial to construct the datastream in a low-latency storage device, such as RAM, before transmitting the datastream to the final storage device. Such cases may be when only one file needs to be backed up, or when the datastream is not very large. In other implementations, it may be necessary to construct the datastream in a high-latency storage device. Such construction may take place in temporary storage unit 106 as shown in FIG. 1.

By being organized and contained in only one datastream, the backup copy not only consumes fewer resources (storage capacity, bandwidth, etc.), but is also easier to restore.

The datastream is compressed and self-contained, meaning all the required components for a restore for any element are in the datastream. In some embodiments, the chunk headers indicate the start of a Data chunk along with the respective Data chunk's compressed size, decompressed size, and compression method. Data chunks may contain information needed to restore every file in the restore operation, and the Chunk map may indicate which Data chunks are needed for a particular file and where in the datastream each Data Chunk is located. The footer indicates the end of a datastream.

Since the datastream has all the components required for a restore, the original data may be discarded. However, in some embodiments, it may be desirable to retain the original data. For example, if the datastream was stored in a remote location, such as a tape warehouse, and the original data was stored locally, it may be desirable to retain the original data for quick access.

Figure 5:
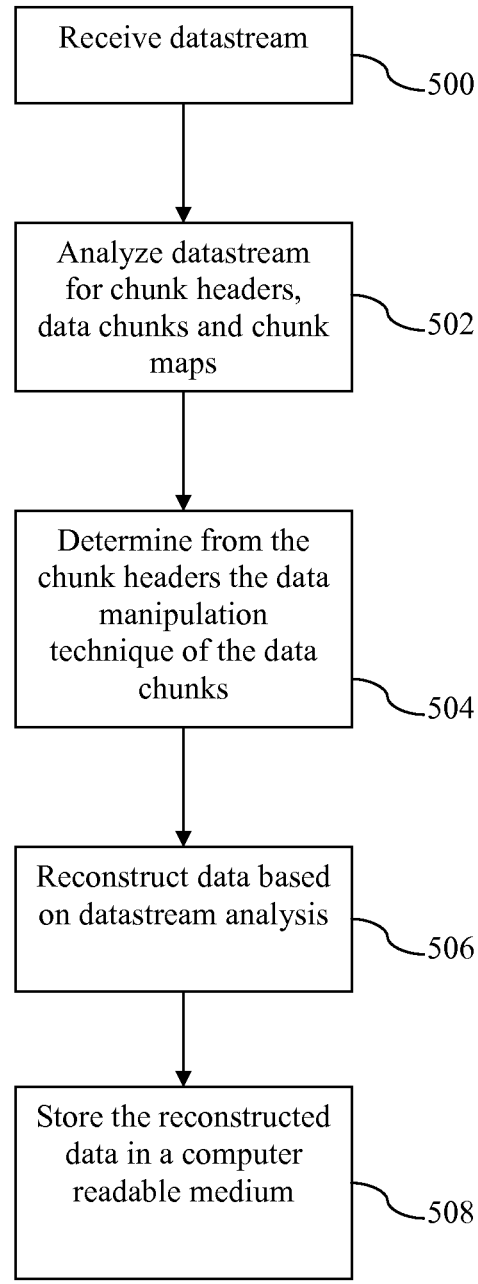
FIG. 5 is a flowchart illustrating a process for restoring information in some embodiments of the invention.

A method to restore data in some embodiments, illustrated by FIG. 5, comprises receiving a datastream in step 500, analyzing the datastream in step 502, reconstructing data based on the datastream analysis in step 504, and storing the reconstructed data in a computer readable medium in step 506. The datastream may be received from multiple locations. For example, if the datastream is very large, it may be stored across multiple tapes.

Similarly, the reconstructed data may be stored in multiple locations. In some embodiments, the reconstructed data is stored on a server to replace a malfunctioning version. In some embodiments, multiple copies of the reconstructed data may be stored on multiple CD-ROMs for distribution. In some embodiments, the reconstructed data may be simultaneously stored on multiple machines. This is also known as replication.

Reconstruction may also occur in multiple stages. For example, the data may be reconstructed to a central server, stage 1. The central server may now contain a secondary datastream, which may be used to decompress data for a separate sever, stage 2, and so on.

At times it may be beneficial for the reconstructed data to be compressed. For example, in certain systems, the data may be restored to a central server, which may further distribute the reconstructed data to other servers or end users. Since raw data may be substantially larger than compressed data, it would be inefficient and costly to transmit raw data from server to server or end user. In order to minimize bandwidth and resource consumption, the reconstructed data would remain compressed after restoration to a central server and during transmission from server to server or end user. Upon arrival to the end user machine, the compressed data would then be decompressed to raw data.

In certain implementations, it may be unnecessary to restore the entire datastream. Take for example the situation in which the datastream contains a backup of an email server. The datastream may contain thousands of emails. Some emails may contain very important discussions between executives, which may be the subject of recovery. Other emails may contain information about a holiday party, which may not need to be restored. In such a case, it would be beneficial and more efficient to restore only certain files. In one embodiment, the backup system can review the Chunk map and specify which chunk headers to skip during a restore operation. This is illustrated in FIG. 6.

Figure 6:
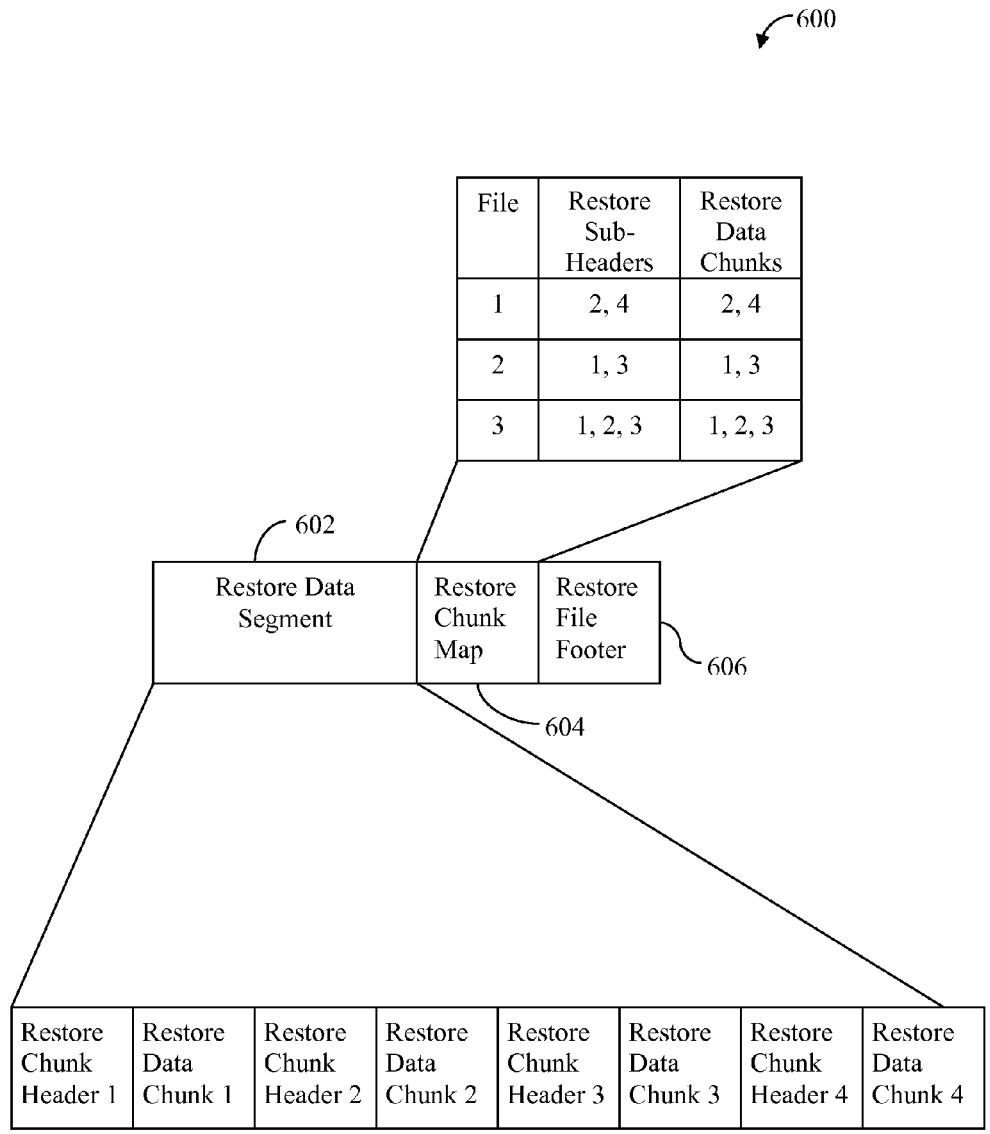
FIG. 6 is a diagram of datastream in some embodiments of the invention.

Referring to FIG. 6, Restore datastream 600 contains Restore data segment 602 and Restore chunk map 604, and Restore file footer 606. Restore datastream 600 contains all the information needed to restore Files 1, 2 and 3. Restore file footer 606 indicates the end of Restore datastream 600. If the user only wanted to restore Files 2 and 3, the back up system could review Restore chunk map 604 to determine which Restore data chunks are necessary. As illustrated in FIG. 6, File 2 requires Restore data chunks 1 and 3, and File 3 requires Restore data chunks 1, 2 and 3. Therefore, only Restore data chunks 1, 2, and 3 are required for the restore, and the back up application may skip Restore data chunk 4 by skipping Restore chunk header 4 in the restore process. By skipping chunk headers, the associated Data chunks are also skipped. This can result in considerable savings of time and bandwidth for the restore operation.

Though the above disclosure mainly refers to data compression techniques, the person of ordinary skill in the art will readily see that the present invention applies equally to other forms of data manipulation, such as data deduplication, data encryption, etc.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for processing data comprising:
   receiving data;
   analyzing the data;
   creating chunk headers, data chunks, and chunk maps, based on analyzing the data;
   storing in the chunk headers information about a data manipulation technique of the data chunks, an unmanipulated data chunk size, and a manipulated data chunk size:
      wherein the data manipulation technique includes deduplication; and
      wherein the information stored in the chunk headers are data chunk specific;
      wherein the chunk headers indicate a size of the data chunks after the data manipulation technique has been applied to the data chunks, and indicate to a backup application that the data chunks are raw data;
   organizing the chunk headers, data chunks, and chunk maps into a datastream;
   storing the datastream in a storage device;
   discarding the data; and
   restoring the data using a second data manipulation technique.

2. The method as recited in claim 1, wherein the data received is manipulated.

3. The method as recited in claim 1, wherein the data received is un-manipulated.

4. The method as recited in claim 3, further comprising manipulating the data.

5. The method as recited in claim 1, wherein chunk headers store sizes of un-manipulated and manipulated forms of respective data chunks.

6. The method as recited in claim 1, wherein chunk maps store locations of file chunk headers in the datastream.

7. The method as recited in claim 1, further comprising augmenting an existing datastream.

8. The method as recited in claim 1, wherein receiving data includes receiving data from multiple sources.

9. The method as recited in claim 1, wherein receiving data includes receiving data from a non-transitory source.

10. The method as recited in claim 1, further comprising organizing the datastream in a low-latency cache.

11. The method as recited in claim 1, wherein storing in the chunk headers information about a data manipulation technique of the data chunks includes storing information about multiple data manipulation techniques.

12. The method as recited in claim 1, further comprising associating a chunk header with a data chunk.

13. A system for processing data, comprising a storage device and a processor configured to:
   receive data;
   analyze the data;
   create chunk headers, data chunks, and chunk maps based on analyzing the data;
   store in the chunk headers a data manipulation technique of the data chunks, an unmanipulated data chunk size, and a manipulated data chunk size:
      wherein the data manipulation technique includes deduplication; and
      wherein the information stored in the chunk headers are data chunk specific;
      wherein the chunk headers indicate a size of the data chunks after the data manipulation technique has been applied to the data chunks, and indicate to a backup application that the data chunks are raw data;
   organize the chunk headers, data chunks, and chunk maps into a datastream;
   store the datastream in a storage device;
   discard the data; and
   restore the data using a second data manipulation technique.

14. A computer program product for processing data, comprising a computer readable medium having program instructions embodied therein for:
   receiving data;
   analyzing the data;
   creating chunk headers, data chunks, and chunk maps based on analyzing the data;
   storing in the chunk headers a data manipulation technique of the data chunks, an unmanipulated data chunk size, and a manipulated data chunk size:
      wherein the data manipulation technique includes deduplication; and
      wherein the information stored in the chunk headers are data chunk specific;
      wherein the chunk headers indicate a size of the data chunks after the data manipulation technique has been applied to the data chunks, and indicate to a backup application that the data chunks are raw data;
   organizing the chunk headers, data chunks, and chunk maps into a datastream;
   storing the datastream in a storage device;
   discarding the data; and
   restoring the data using a second data manipulation technique.

* * * * *